A. E. NIELSEN.
PASTING MACHINE.
APPLICATION FILED AUG. 14, 1909.
1,034,492.
Patented Aug. 6, 1912.
9 SHEETS—SHEET 4.
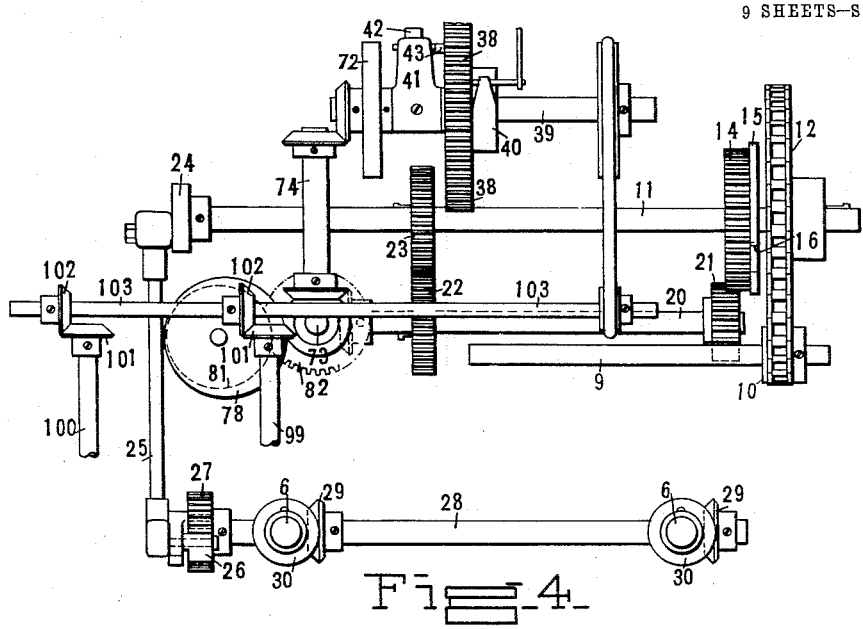
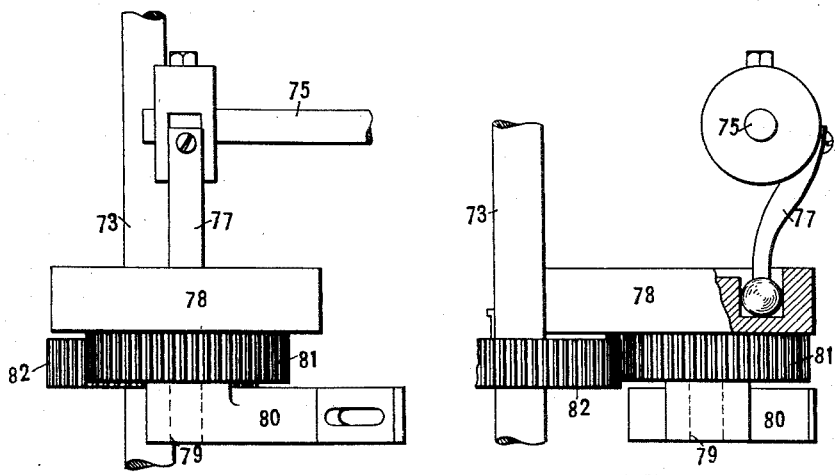
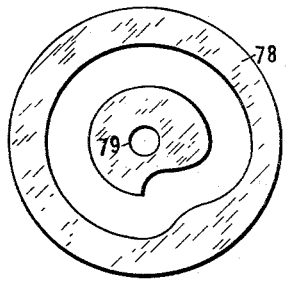
WITNESSES
INVENTOR
A. E. Nielsen
BY
ATTORNEYS A. E. NIELSEN.
PASTING MACHINE.
APPLICATION FILED AUG. 14, 1909.
1,034,492.
Patented Aug. 6, 1912.
9 SHEETS—SHEET 5.
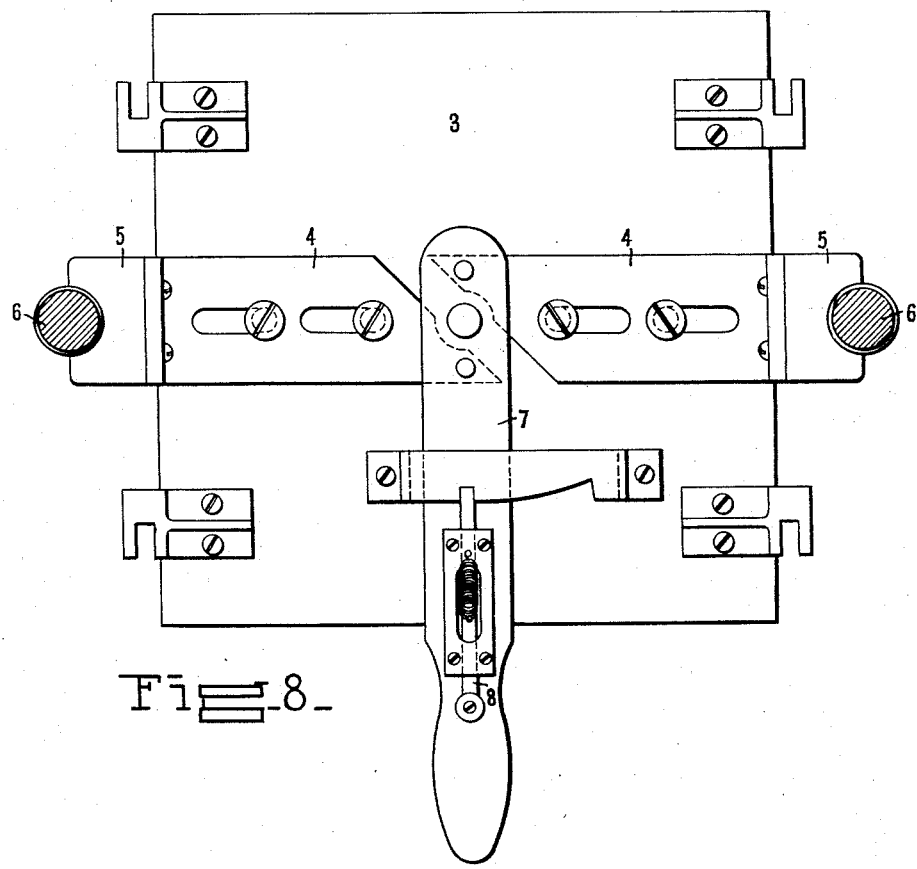
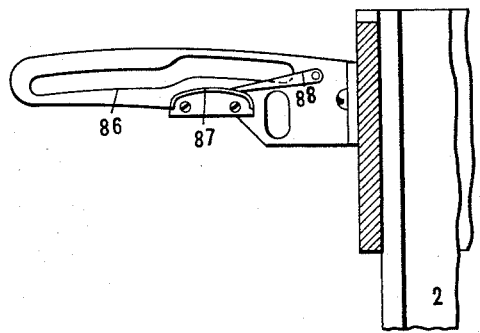
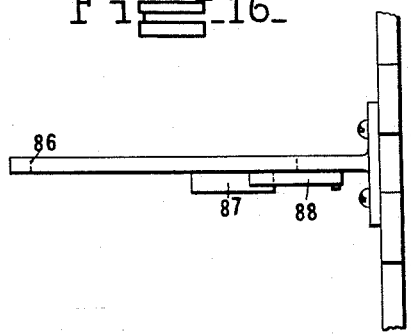
WITNESSES:
INVENTOR
A. E. Nielsen
BY
ATTORNEYS

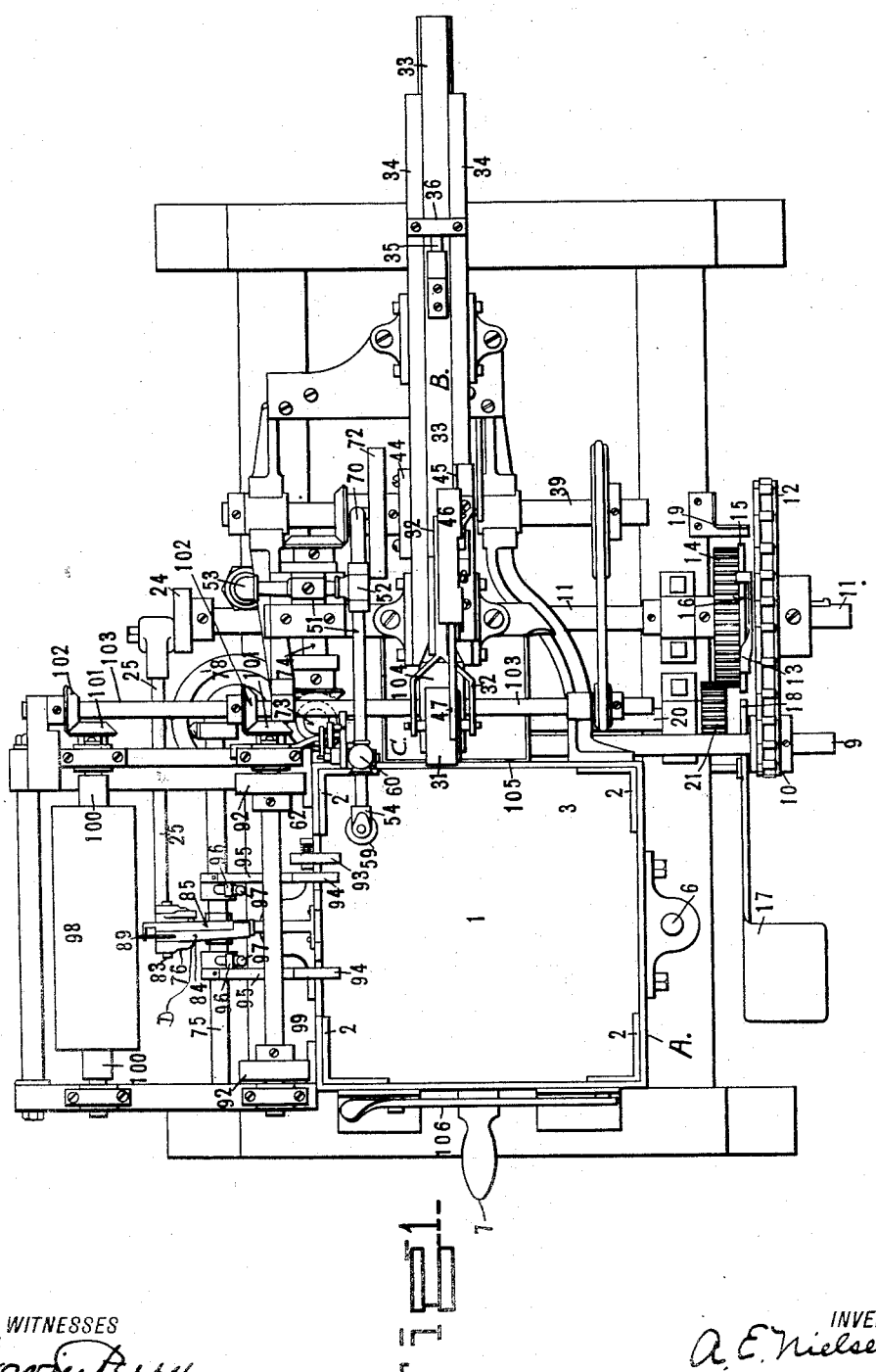

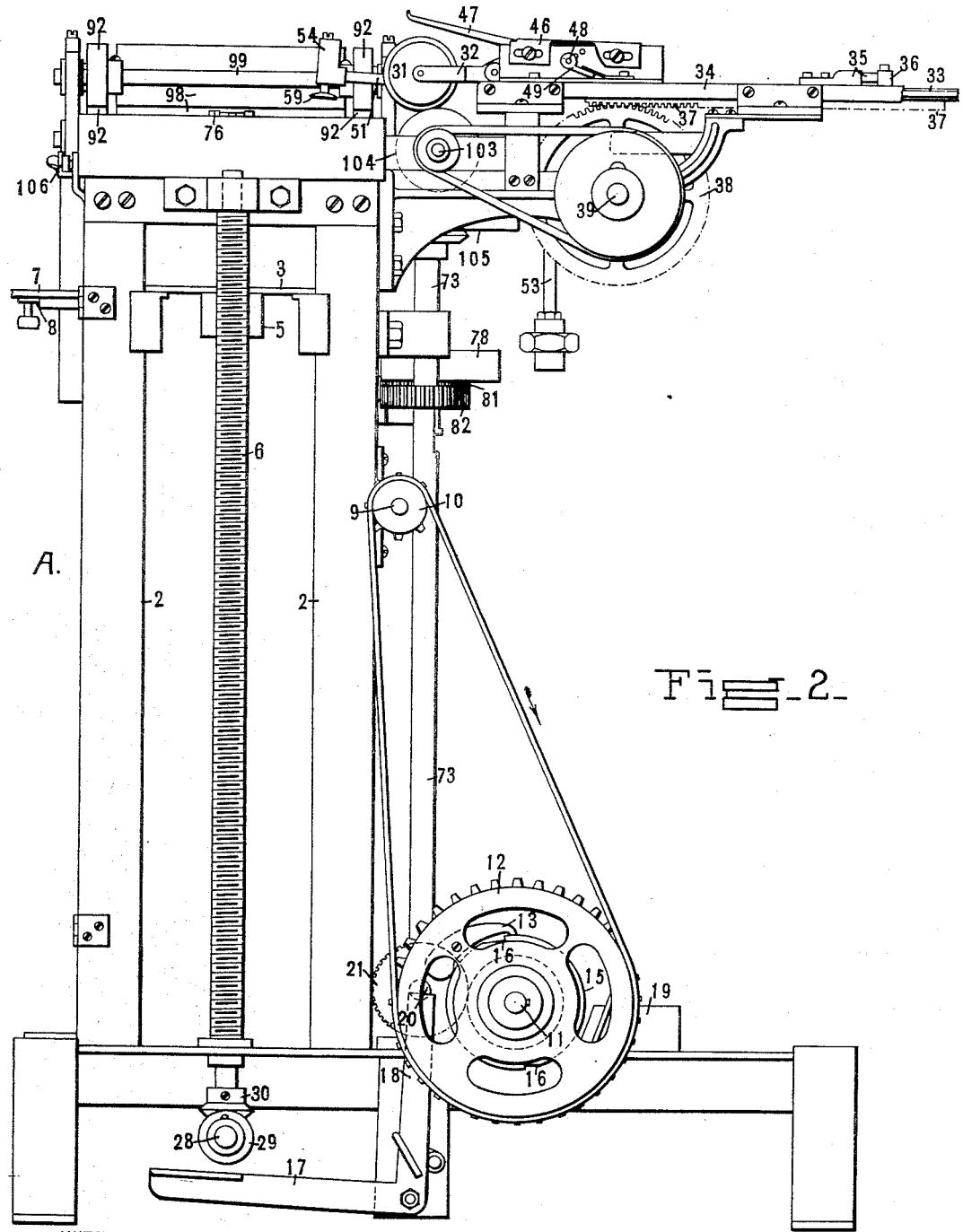

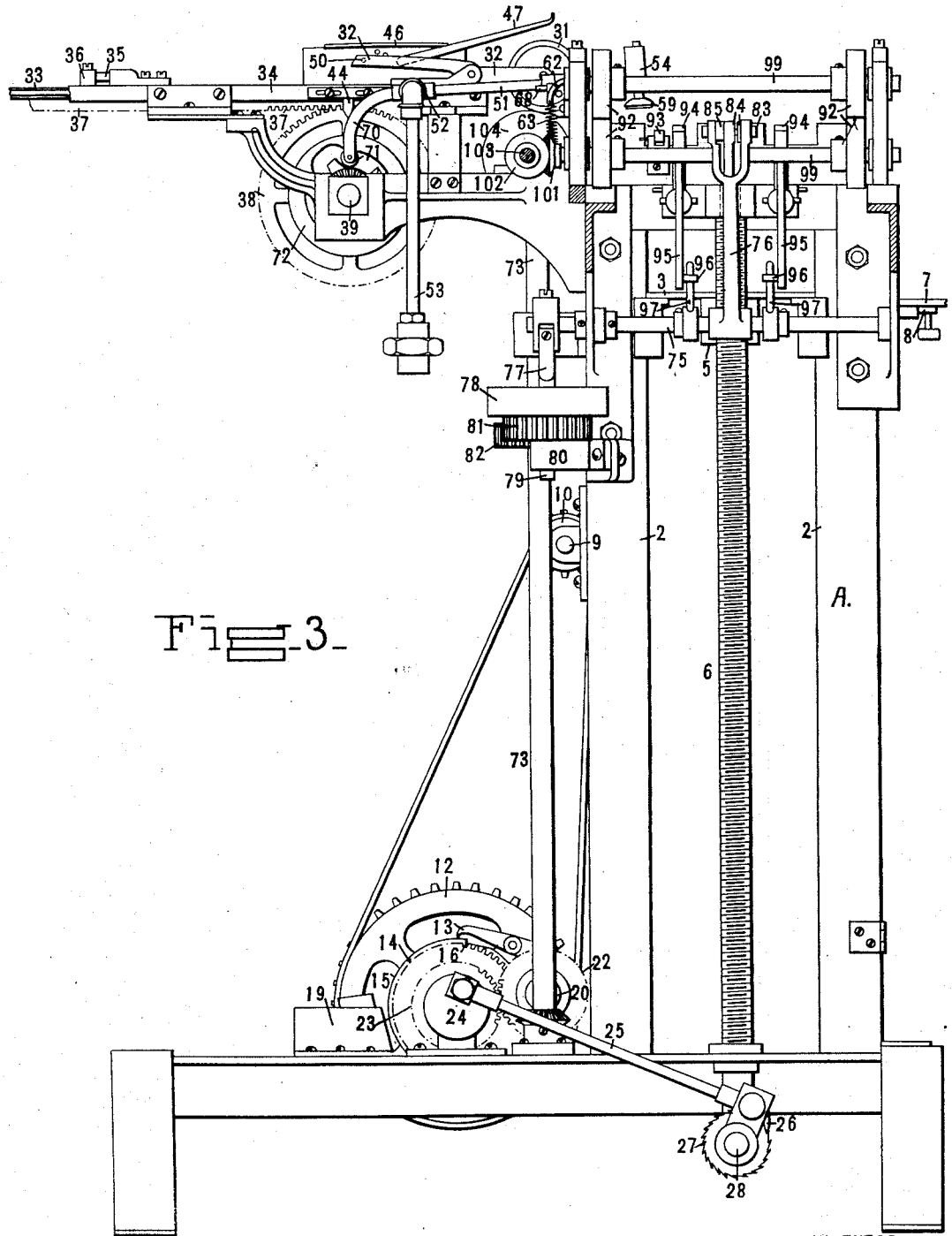

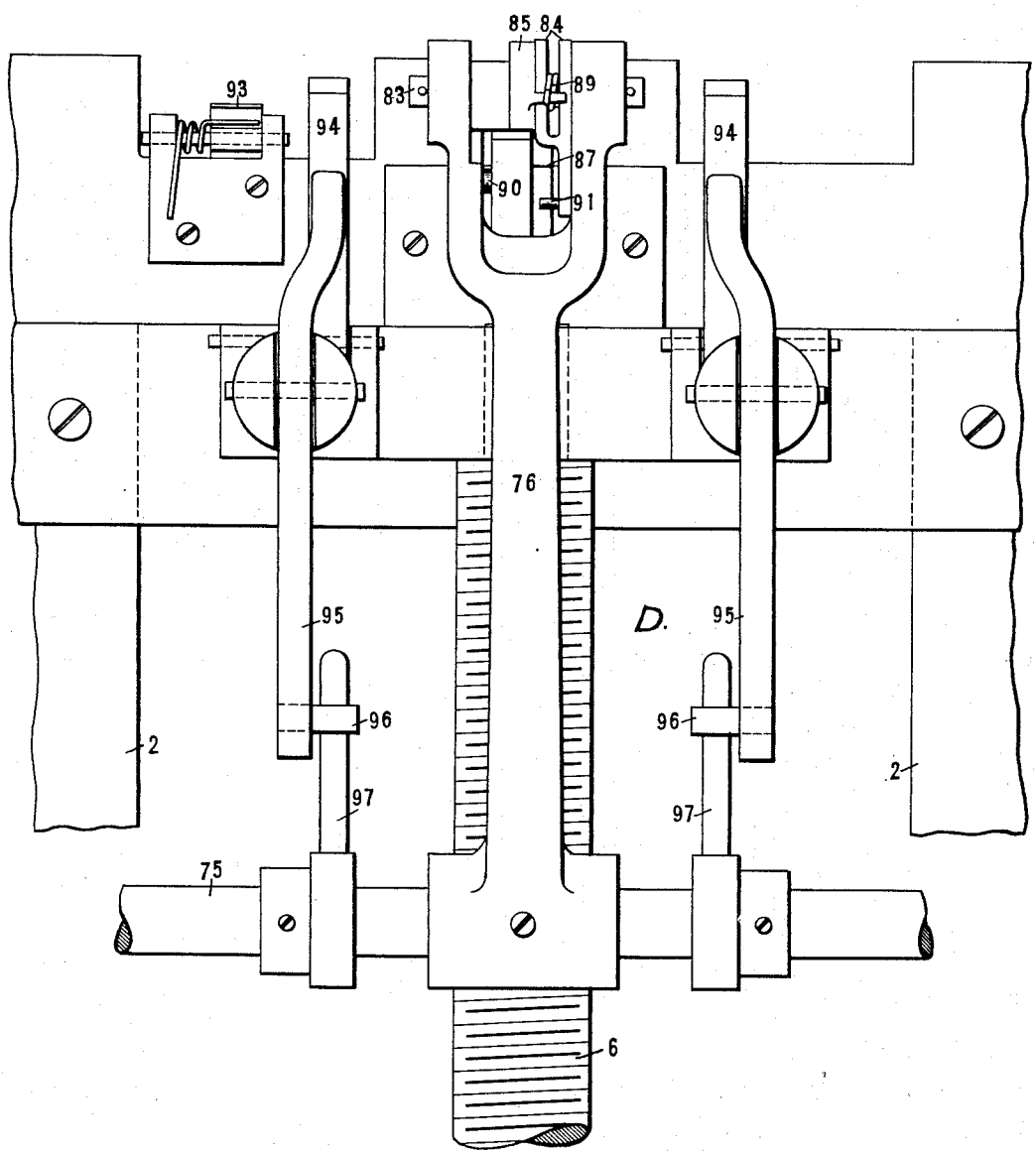

A. E. NIELSEN.
PASTING MACHINE.
APPLICATION FILED AUG. 14, 1909.
1,034,492.
Patented Aug. 6, 1912.
9 SHEETS—SHEET 7.
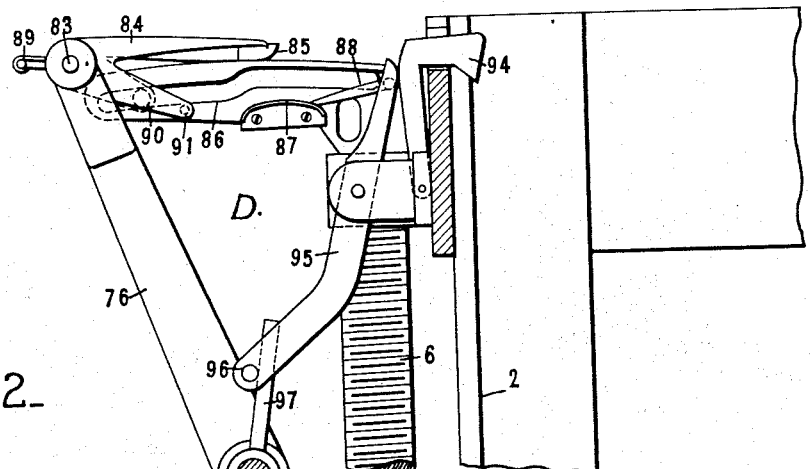
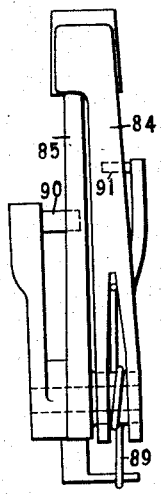
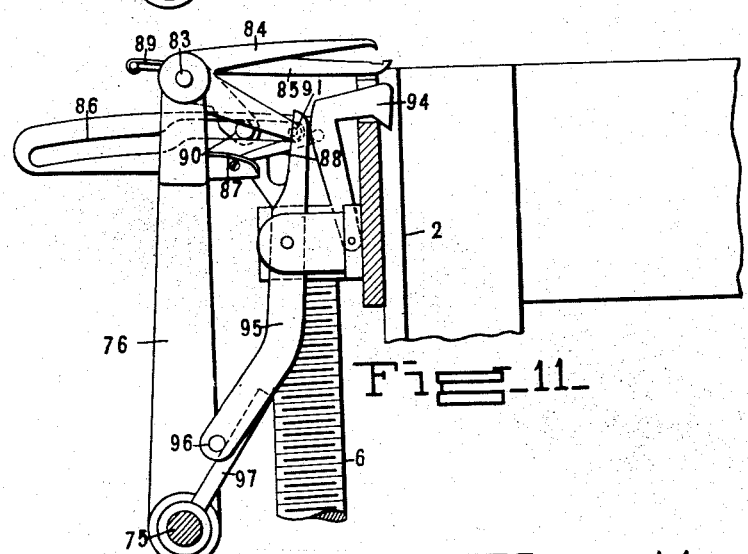
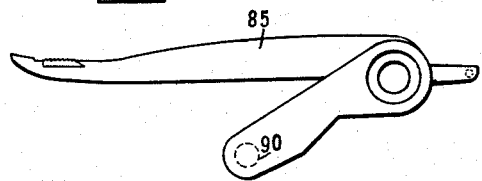
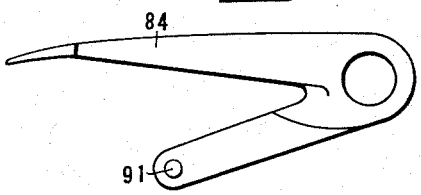
WITNESSES:
INVENTOR
A. E. Nielsen
BY
ATTORNEYS A. E. NIELSEN.
PASTING MACHINE.
APPLICATION FILED AUG. 14, 1909.
1,034,492.
Patented Aug. 6, 1912.
9 SHEETS—SHEET 8.
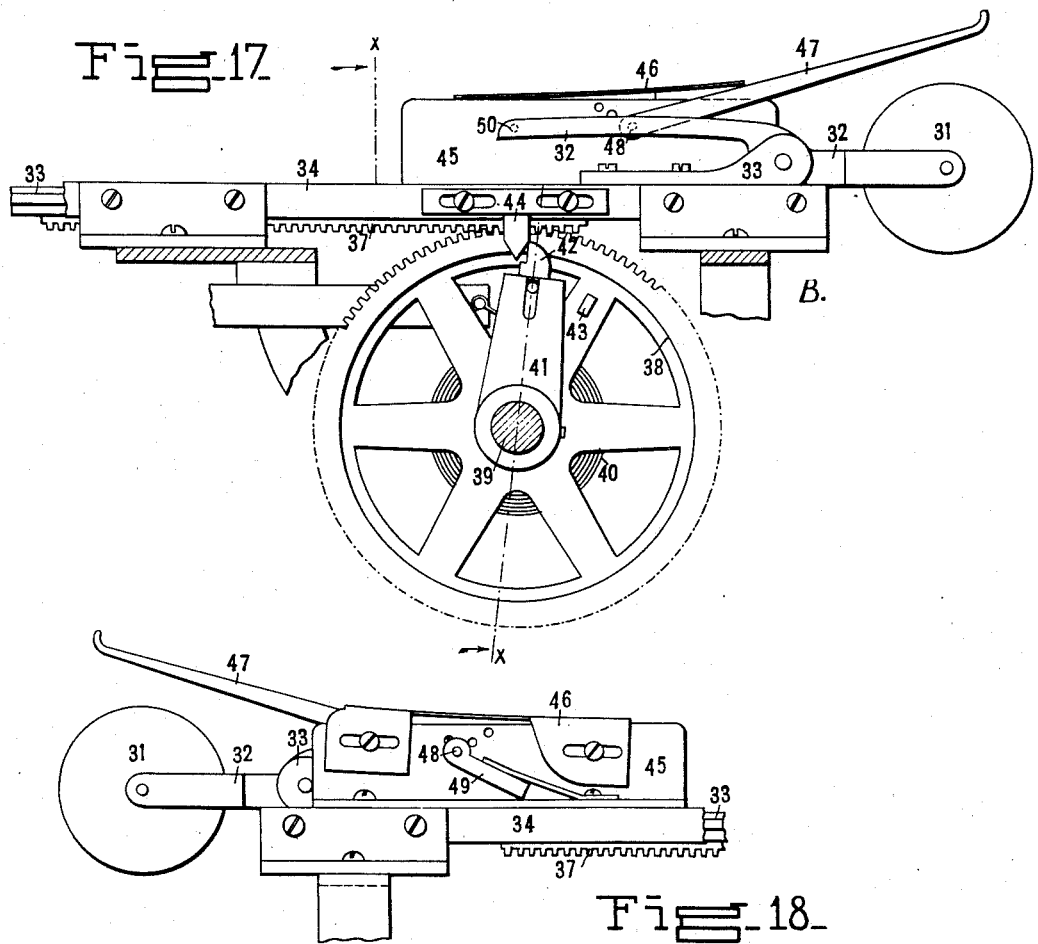
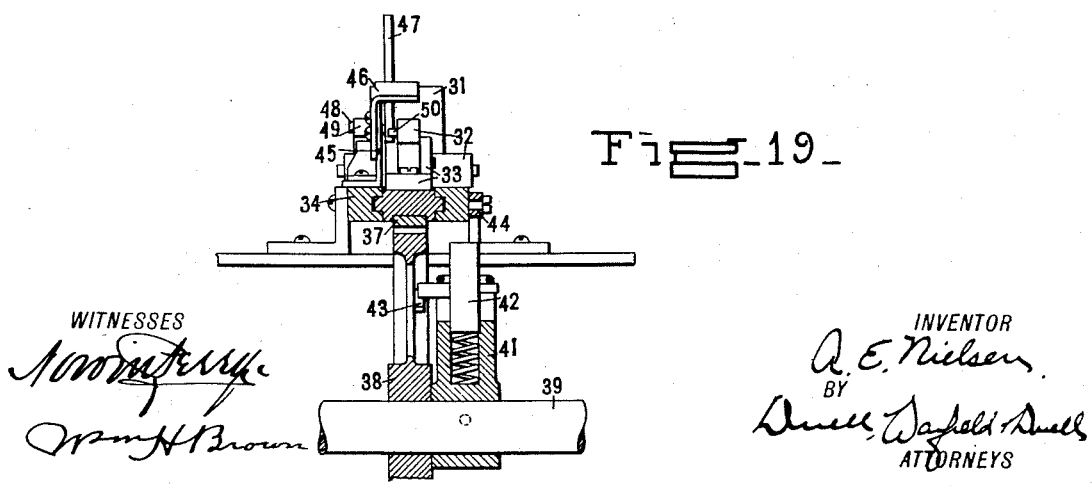

A. E. NIELSEN.
PASTING MACHINE.
APPLICATION FILED AUG. 14, 1909.
1,034,492.
Patented Aug. 6, 1912.
9 SHEETS—SHEET 9.
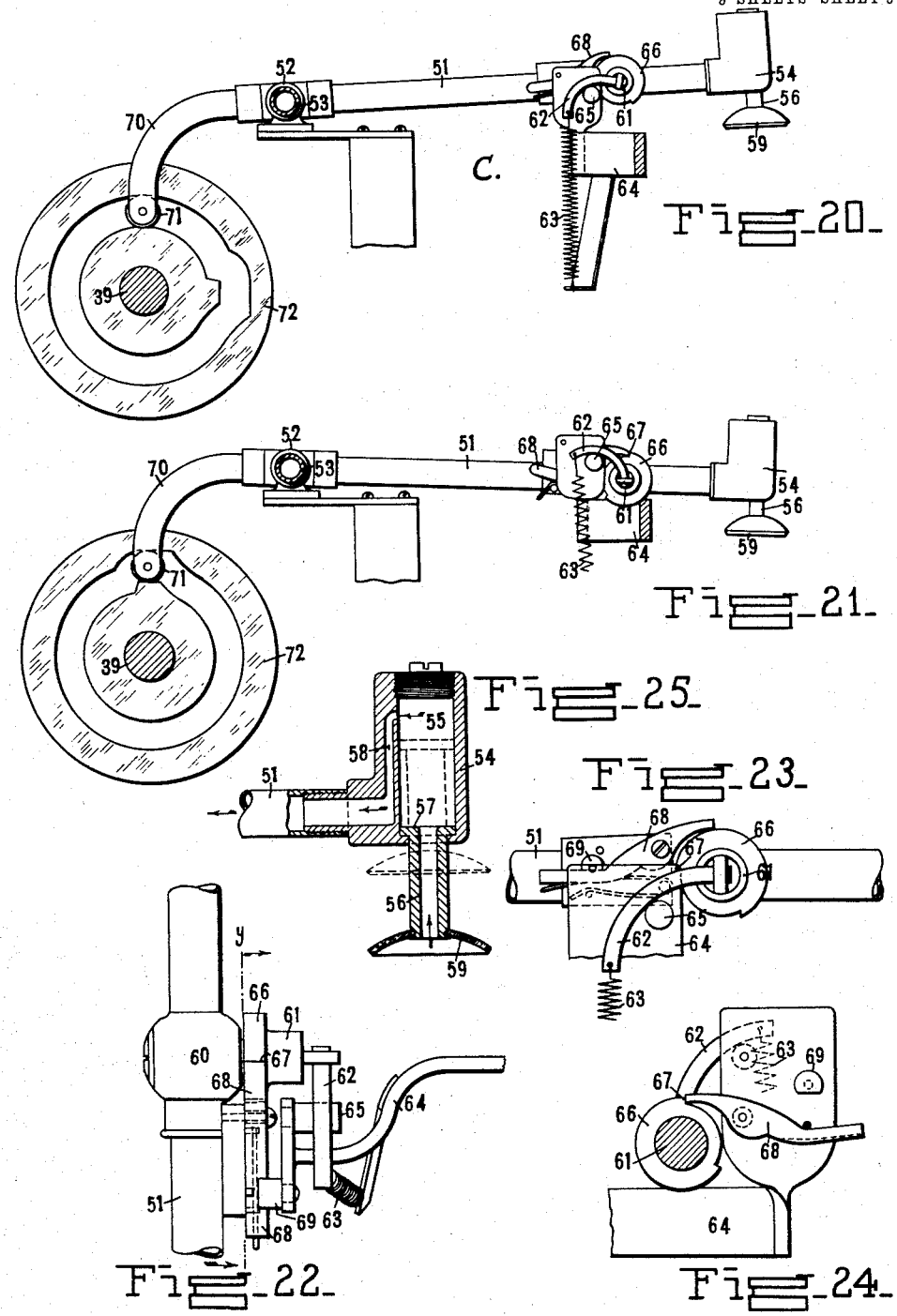

UNITED STATES PATENT OFFICE.

ANTON E. NIELSEN, OF BROOKLYN, NEW YORK, ASSIGNOR TO FRANK WOLF, OF NEW YORK, N. Y.

PASTING-MACHINE.

1,034,492.    Specification of Letters Patent.    Patented Aug. 6, 1912.

Application filed August 14, 1909. Serial No. 512,802.

*To all whom it may concern:*

Be it known that I, ANTON E. NIELSEN, a citizen of the United States, residing at Brooklyn, in the county of Kings and State of New York, have invented certain new and useful Improvements in Pasting-Machines, of which the following is a full, clear, and exact description, such as will enable others skilled in the art to which it appertains to make and use the same.

This invention relates to pasting machines and in particular to machines adapted to apply paste to the surface of a card designed to receive a sample of cloth or other material.

One of the objects thereof is to provide a simple and compact machine for applying the paste to the card and thereafter to automatically discharge the card from the machine, sufficient time being allowed between these operations for the operator to accurately place a sample upon the card in contact with the pasted portion thereof.

Another object thereof is to provide simple and efficient mechanism for applying the paste.

Another object is to provide positively acting means adapted to lift the card upon which the sample has been laid and to deliver it to the discharging mechanism.

A further object is to provide a simple, efficient, and properly timed means whereby the card is received from the card lifter and delivered to the discharging rollers.

Yet another object is to provide a machine capable of holding a plurality of cards and having means adapted to feed said cards into proper position to be operated upon.

A still further object is to provide mechanism adapted to drive the several parts of the machine, and to accurately time the several operations thereof.

Other objects will in part be obvious and in part pointed out hereinafter.

The invention accordingly consists in the features of construction, combinations of elements and arrangement of parts which will be exemplified in the construction hereinafter set forth, and the scope of the application of which will be indicated in the following claims.

Referring, now, to the drawings, wherein is shown one of the various possible embodiments of the present invention, Figure 1 is a plan view of the machine, showing the relation of the various parts; Fig. 2 is a front elevation of the same; Fig. 3 is a rear elevation partly in section; Fig. 4 is a plan view of the gearing and transmission mechanism, the rest of the machine being omitted; Fig. 5 is an enlarged rear view of the mechanism for driving the picker arm, and Fig. 6 is an enlarged side view of the same; Fig. 7 is a detail view of the cam employed to transmit motion to the picker arm; Fig. 8 is a bottom view of the plate or table which supports the cards within the frame of the machine; Fig. 9 is a rear elevation of the picker arm with its associated mechanism; Fig. 10 is a side elevation of the picker arm and fingers, in rearward position, showing part of the frame broken away and the card alinement breakers in forward position; Fig. 11 is a view of the same parts in their opposite positions; Fig. 12 is a plan view of the picker mechanism; Fig. 13 is a detail side view of the lower picker finger; Fig. 14 is a detail side view of the upper picker finger; Fig. 15 is a cross-section of a part of the machine, showing the cam surfaces which actuate the picker fingers; Fig. 16 is a plan view of the same; Fig. 17 is a rear view of the pasting roller, its supporting arm and operating mechanism; Fig. 18 is a front view of the same partially broken away; Fig. 19 is a section on line $x$—$x$ of Fig. 17; Figs. 20 and 21 are rear views of the vacuum card lifter mechanism in raised and lowered positions, respectively; Fig. 22 is a plan view of a section of the vacuum conduit, showing the vacuum valve therein and operating mechanism; Fig. 23 is a rear view of the valve and associated mechanism; Fig. 24 is a section taken on line $y$—$y$ of Fig. 22; and Fig. 25 is an enlarged cross-section taken through the vacuum lifter head.

Similar reference characters refer to similar parts throughout the drawings and specification.

Before entering into a description of the specific features of this invention, and in order that certain objects thereof may be more readily understood, it may be here noted that manufacturers of various textile fabrics make up large quantities of samples which are pasted upon appropriate cards and sent out to the trade. Most of this work is done by hand, and is therefore very costly and slow. By the present invention the cards have paste applied to them automatically in the manner desired, which is, usually, so that the sample will adhere along one edge only. It is found desirable, after the pasting roller has operated, that the machine should cease all movement for a period sufficiently long to permit of the sample being correctly located upon the card, and then operate again to remove the finished sample card. This is herein accomplished by imparting to the main drive shaft of the machine an intermittent movement and by including in the driving mechanism of the several parts properly proportioned cams.

Referring, now, to Figs. 1, 2 and 3 of the drawings, the machine in general comprises an upright frame A constituting a reservoir 1 for cards. Suitably mounted upon this frame is the pasting mechanism B. Located rearwardly of the pasting device is a vacuum lifter device C, and rearwardly of the reservoir, as shown in Fig. 1, is the picker arm and associated mechanism D. Referring to the card reservoir more in detail, it will be seen that it comprises a skeleton framework 2. Within this reservoir the plate or table 3 is adapted to slide up and down. This table constitutes the support for a pile of horizontally arranged cards. Slidably mounted on the bottom side of the plate 3 are two members 4 to which are fastened half nuts 5 which in turn engage with vertical feed screws 6. At their inner ends these members 4 are oppositely tapered and near their extreme inner ends are pinned to a lever 7 through the movement of which they are thrown together or apart engaging or disengaging the half nuts 5 with the screws 6. With the lever 7 in the position shown in Fig. 8 the nuts mesh with the screws and upon rotation of said screws the table 3 is fed upwardly within the reservoir 1 a predetermined distance during each cycle of operations of the machine. By withdrawing the finger latch 8 the lever 7 may be swung to the right in Fig. 8 so as to disengage the nuts 5 from the screws 6, and thus enable the operator to manually lower the table.

Referring to Fig. 4, the shaft 9 is driven constantly from any source of power and fastened tightly thereto is a cog-wheel 10. A shaft 11 has loosely arranged thereon a corresponding cog-wheel 12 which carries on its inner face a pivotally mounted dog 13 (see Figs. 2 and 3). Adjacent said cog-wheel 12 a pinion 14 is also loosely mounted on the shaft 11. This pinion is provided with a flange 15 having notches 16 cut therein at opposite sides thereof. As the cog-wheel 12 rotates, the dog 13 is permitted to engage with the notches 16 when the foot lever 17 is pressed down. When foot lever 17 is released, its upper arm 18 prevents the engagement of the dog 13 with the notches 16. In Fig. 3 there is shown a block or tripping member 19 which is adapted to engage the tail of the dog 13 and throw the same out of the notches 16, after which the cog-wheel 12 rotates half a revolution, the pinion 14 remaining idle, and then the dog 13 engages with the diametrically opposite notch 16 to again rotate the pinion 14. A shaft 20 has thereon a pinion 21 which meshes with the pinion 14, the shaft 20 being intermittently rotated thereby. As the diameter of the pinion 21 is one-half that of the pinion 14, the shaft 20 makes a complete revolution for every intermittent half revolution of the pinion 14. Another pinion 22 on said shaft 20 meshes with the pinion 23 fast upon shaft 11 and thereby transmits to said shaft 11 an intermittent rotation. When the foot lever 17 is released the dog 13 is held out of engagement with the notches in the flange of the pinion 14, so that no movement is transmitted to the rest of the machine. Upon the end of the shaft 11 is an adjustably arranged, eccentric member or crank 24. To this crank is pivotally secured one end of a connecting rod 25, the other end of which carries a ratchet member or pawl 26 adapted to engage with the teeth of a ratchet wheel 27 keyed to the cross-shaft 28. On this cross-shaft 28 are fastened bevel-gears 29 which intermesh with bevel-gears 30, secured to the lower ends of the feed screws 6. The eccentric member 24 is adjusted so that with every revolution of the shaft 11, the feed screws 6 are rotated to feed the table 3 a distance equal to the thickness of a card.

Now, turning to the pasting mechanism, best shown in Figs. 1 to 3 and 17 to 19, inclusive, 31 is a pasting roller adapted to apply paste to the face of the top card in the reservoir. This roller 31 is pivotally mounted between the bifurcations of a forked lever 32 which is itself pivotally secured intermediate its ends to the slide member 33. This slide member is adapted to reciprocate within a guide 34 and has mounted thereon a resilient stop member 35 adapted to engage an abutment or stop 36 mounted upon the guides. A rack 37 is secured to the bottom of the slide 33 and is designed to intermesh with a gear 38 freely rotatable about the shaft 39. Surrounding the shaft 39 is a clock spring 40 one end of which is attached to the gear 38, and the other end to the frame of the machine. This spring tends to turn the gear 38 to hold the slide 33 in its rearward position. Mounted fast upon the shaft 39 is a member 41 provided with a spring pressed dog 42 adapted to engage with an abutment 43 projecting from the side of the gear 38 and to carry the gear around with said member 41. When the pasting roller 31 has reached the end of its forward movement, the spring pressed dog 42 comes into end contact with an adjustable tripping member 44 fastened to the side of the guide 34, whereby the dog 42 is depressed and releases the gear 38, which is immediately oppositely rotated by the spring 40, thereby quickly returning the pasting roller to its rearward position. Mounted upon the guide 34 is an angle-plate 45. Adjustably secured to plate 45 is another plate 46 which takes over the top thereof for a purpose to be hereafter described. 47 is an arm pivotally mounted on the plate 45 by a pin 48; pin 48 has fastened to its other end, at the opposite side of plate 45 from the arm 47, a spring pressed member 49. This member can be adjusted upon pin 48 so as to vary the inclination of the arm 47. The inner end of the lever 32, upon forward movement of the pasting device, rests against the horizontal portion of the plate 46 and prevents the pasting roller from dropping down into contact with the card too early in its stroke. When the lever end passes from under the plate 46 the roller drops down upon the card, applying paste thereto during the remainder of its forward stroke. When the pasting mechanism is released and begins its rearward movement a pin 50 upon the lever 32 passes under the upper end of the arm 47 and as the slide continues its rearward movement the pasting roller is lifted from the card. During its forward travel the pin 50 passes over the arm 47. It will be seen that as these parts are adjustable, the time during which the pasting roller is to be in contact with the card may be nicely determined.

C is the vacuum card lifting mechanism, best shown in Figs. 20 to 25, inclusive. A vacuum conduit 51 is pivotally secured at 52 to the end of the vacuum pipe 53, the latter being provided with suitable means for connection with a source of vacuum. At one end the vacuum conduit 51 is provided with a lifter head 54 shown in section in Fig. 25. The lifter head comprises a fitting having therein a chamber 55. Extending through the bottom wall of this chamber is a tubular plunger 56, provided with a head 57 fitting air-tight within the chamber 55. A shoulder in the chamber co-acts with the head on the plunger to limit the downward movement of the latter. In the wall of the fitting is a passage 58 opening into the chamber 55 near the top thereof and connecting at its other end with the conduit 51. An opening in the top of the chamber 55 is closed by a plug. At its lower end the plunger 56 is provided with a rubber sucker 59 adapted to be brought into contact with a card in the reservoir. In the conduit 51 intermediate the lifter head 54 and the pivotal point 52 is located a rotary plug-valve 60 of any ordinary construction. 61 is the valve-stem and fastened thereto is a curved arm 62 attached at its other extremity by means of a spring 63 to a bracket 64 on the frame of the machine. Arm 62 rests upon a pin 65 secured in the bracket 64. Surrounding the stem of the valve is a flange 66, the circumference of which is provided with a notch 67. Pivotally mounted upon the conduit 51 is a spring pressed dog 68, one end of which is adapted to engage with the notch 67 when the valve is turned to open position. Upon bracket 64 is located a pin 69 in position to be engaged by the other end of the dog 68, thereby releasing the valve and allowing it to close. The conduit 51 has a solid extension 70 provided at its end with a roller 71 formed and adapted to follow the groove in a cam member 72 fast upon the shaft 39. Said shaft 39, which also carries the gear 38 and member 41 heretofore described, is driven through bevel-gearing and intermediate shafts 73 and 74 by the shaft 20, as shown in Fig. 4. Upon rotation of the cam member 72 the vacuum conduit 51 is oscillated and the lifter head lowered toward the card. As the conduit moves downwardly the pin 65 engages with the curved arm 62 of the valve-stem 61 and opens the valve. Now, when the lifter head comes in contact with the card, the vacuum draws the card tightly against the sucker 59 and closes the passage through the plunger 56. The plunger is now drawn up within the chamber 55 with a very rapid movement, which lifts the top card slightly from the card next below it. The cam 72 continuing its rotation, the vacuum conduit and the lifter head are raised and just before reaching the top of their upward movement the pin 69 engages the end of the dog 68 and releases the same from its engagement with the notch 57. The spring 63 now closes the valve and shuts off the vacuum from the lifter head; the latter, just before it reaches the limit of its upward movement, drops the card, which is then received by picker mechanism, to be hereafter described.

Referring to Figs. 1, 3 and 9, 75 is a rock-shaft carrying tightly fixed thereto the picker arm 76. The shaft 75 is given a rocking or oscillating movement by engagement of a member 77 mounted at the end thereof with a cam 78 fastened to the shaft 79. The shaft 79 has a bearing in a bracket 80 extending outwardly from the frame of the machine. 81 is a gear, fast upon said shaft 79, and intermeshing with a gear 82 carried by the above mentioned shaft 73. The shaft 73 has at its lower end a bevel-gear which engages with a similar gear mounted upon the shaft 20, heretofore described. At its upper end (see Fig. 9) the picker arm 76 is bifurcated, and extending between the bifurcated ends is a pin 83. Loosely supported by said pin are the upper and lower picker fingers 84 and 85 which are shaped like bell-crank levers, one end of each of them constituting a finger adapted to lie one over the other, and their other ends carrying pins adapted to engage with the cam surfaces 86 and 87 and with the member 88 (see Figs. 10 to 16, inclusive). Normally the fingers are forced downwardly and together by their own weight and by the spring 89 shown in Fig. 9. As the rock-shaft 75 rocks forward the pin 90 upon the lower picker finger 85 travels along the cam surface 86 and lifts both the upper and lower fingers so that they clear the edge of the frame, as shown in Fig. 11. During the same interval the pin 91 on the upper finger 84 travels over the cam surface 87 up to and onto the pivotally mounted member 88 and then travels upwardly along the upper surface of said member. This latter movement raises the upper picker finger away from the lower picker finger, in which position it is maintained until the picker arm has reached the limit of its forward movement. The various parts are so timed in their operation that the picker arm reaches the limit of its forward movement at the same instant that the vacuum lifter head releases the card, which now falls down upon the projecting lower picker finger 85. Immediately the pin 91 upon the upper picker finger passes over the end of the member 88, allowing the fingers to close upon the card. Further rotation of the cam 78 starts the picker arm rearwardly, the pin 91 returning along the lower side of the member 88. When the picker arm reaches a certain point in its rearward movement, the card is taken therefrom by the first pair of discharging rollers 92, shown in Figs. 1, 2 and 3. Mounted upon the upper rear edge of the reservoir frame 2 is a spring clip 93 which presses down upon the top card and impositively holds it in position. It has been found that as the cards feed upwardly they tend to preserve their alinement, and in order to render the action of the vacuum lifter satisfactory, it is necessary to break said alinement. For this purpose are provided alinement breakers 94, shown in Figs. 9, 10 and 11. These breakers, while the picker arm is in its forward position, merely rest against the edges of the upper cards, but upon the picker arm reaching its rearward position the breaker members are engaged by the upper ends of levers 95 which are pivotally secured to the frame of the machine intermediate their ends. Their lower ends are provided with pins 96 which are in position to be hit by members 97 rigidly secured to the rock-shaft 75. By this means, each time the lifter and picker mechanisms operate to remove a card from the top of the reservoir the breakers are forced forward and the alinement of the cards slightly destroyed. It is to be understood that the spring clip 93 bears very lightly upon the top card and does not prevent the card from being lifted by the lifter head 54. Upon the card being lifted the clip falls to the next card to insure the accurate working of the machine. The picker fingers deliver the card to the first discharging rollers 92 which carry it backward above the picker mechanism, the fingers of which have descended beneath the plane of contact of the pairs of rollers, during their rearward movement. The card is now taken up by the rear pair of rollers 98, which press the sample tightly down upon the card, insuring proper adhesion, and then deliver the card outside of the machine. The rollers 92 and 98 are carried by shafts 99 and 100 having on their inner ends bevel-gears 101 which mesh with like gears 102 upon a cross-shaft 103. Cross-shaft 103 has also supported thereon a paste supplying roller 104 which rotates within a paste containing reservoir 105 (see Fig. 1). When the pasting roller 31 is in its rearward position it rests upon the paste supplying roller 104 and receives paste therefrom. The shaft 103 is driven by means of a belt connection with the shaft 39 heretofore described, as shown in Figs. 1 and 4. At one side of the card reservoir the frame plates are hinged so as to swing outwardly to permit of the refilling of the reservoir. A latch 106 of any preferred construction normally holds these door plates in closed position, as indicated in Fig. 1.

The general operation is as follows: Upon the foot lever 17 being pressed down, the dog 13 engages alternately the diametrically opposed notches on the surface of the gear-wheel flange 15 and transmits an intermittent rotation from the sprocket-wheel 12 throughout the machine. The pasting roller is first moved forward and dropping down upon the top card supplies paste thereto along the line of its travel. At the end of its forward movement the pasting device is released, as heretofore described, and is quickly drawn back by the spring 40, the roller being lifted from the card. The picker arm and the lifter head now start moving substantially simultaneously, the lifter head moving downwardly and the picker arm rocking forwardly. The lifter arm reaches the downward limit of its movement, lifts the card, and rises to its uppermost position in time to deliver the card to the picker fingers, which are now open and have reached their forward position. The picker fingers now close and are retracted to deliver the card to the discharging rollers. When the picker arm has nearly reached the limit of its rearward movement the breakers are operated to destroy the alinement of the upper cards. At the same time the feed screws are given a partial rotation, thereby feeding the cards upwardly in the reservoir a distance equal to the thickness of one card. The cycle of operations is then repeated. After the pasting roller has moved forward and back the mechanism ceases movement for a sufficiently long interval of time to enable the operator to accurately attach the sample to the card. The sample may be applied by hand, as herein provided, or by means of mechanism such as is commonly used to transfer the sheets of paper in a printing press. In the latter case the entire operation of the machine will be automatic.

It will accordingly be seen that herein is provided a machine well adapted to attain the objects heretofore set forth, in a positive and reliable manner, said machine being compact in form and simple in construction and operation.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense. It is also to be understood that the language used in the following claims is intended to cover all of the generic and specific features of the invention herein described, and all statements of the scope of the invention which, as a matter of language, might be said to fall therebetween.

Having described my invention, what I claim as new and desire to secure by Letters Patent is:

1. In apparatus of the character described, in combination, a frame constituting a reservoir for cards, means for applying paste to said cards, means for feeding said cards, a rock-shaft journaled on said frame, a picker arm mounted thereon and adapted to rock therewith, a pair of fingers pivotally mounted on said picker arm, a vacuum card lifter adapted to deliver a card to said fingers when said arm is rocked to its forward position, and discharging rollers adapted to receive said card from said picker fingers.

2. In apparatus of the character described, in combination, a frame constituting a reservoir for cards, means for feeding said cards, a pasting roller, means for supplying paste to said roller, means for lifting the top card, picker means adapted to receive said card from said lifting means, and discharging rollers adapted to receive said card from said picker means.

3. In apparatus of the character described, in combination, a frame constituting a reservoir for cards, means for feeding said cards, a transversely reciprocating pasting roller, means for lifting the top card upon completion of the pasting operation, picker means adapted to operate simultaneously with said lifting means to receive said card therefrom, and discharging rollers adapted to remove said card.

4. In apparatus of the character described, in combination, a frame constituting a reservoir for cards, means for feeding said cards, a transversely reciprocating pasting roller, means for lifting the top card upon completion of the pasting operation, picker means adapted to operate substantially simultaneously with said lifting means to receive said card therefrom, discharging rollers adapted to remove said card, and an intermittently rotating drive shaft adapted to operate the several moving parts of said apparatus.

5. In apparatus of the character described, in combination, a frame constituting a reservoir for cards, means for feeding said cards, a spring clip adapted to exert pressure upon the top card, means for breaking the alinement of said cards, a pasting roller, a second roller adapted to supply paste to said pasting roller, a reservoir for paste, vacuum means for lifting said top card, picker means adapted to receive said card from said lifting means, and discharging rollers adapted to remove said card.

6. In a machine of the character described, in combination, an upright frame constituting a reservoir for cards, means for applying paste to said cards, a table adapted to move up and down within said frame, a nut secured to said table, a screw intermeshing with said nut, a shaft adapted to rotate said screw, a ratchet-wheel mounted on said shaft, and a rod connected at one end to an adjustable crank-pin and provided at the other end with a pawl adapted to intermittently give said ratchet-wheel a partial rotation.

7. In a machine of the character described, in combination, an upright frame constituting a reservoir for cards, means for applying paste to said cards, a table adapted to move up and down within said frame, a nut secured to said table, a screw intermeshing with said nut, a shaft adapted to rotate said screw, a ratchet-wheel mounted on said shaft, a rod connected at one end to an adjustable crank-pin and provided at the other end with a pawl engaging said ratchet-wheel, and means for rotating said crank-pin.

8. An apparatus of the character described, comprising, in combination, a table supporting a card, a member adapted to reciprocate transversely over said card, a pasting roller pivotally secured to said member, and means adapted to permit said roller to come in contact with said card during a portion of its stroke in one direction and to lift it from said card at a predetermined point in its return stroke.

9. An apparatus of the character described, comprising, in combination, a table supporting a card, a reciprocating rack, a member pivotally mounted intermediate its ends upon said rack, a pasting roller carried by one of said ends, adjustable means adapted to engage with the other of said ends to hold said roller away from said card during part of its forward movement and to permit it to touch said card during the remainder of said movement, a pin on said member, and an adjustable arm adapted to engage said pin upon the return of said roller to lift the latter out of contact with said card.

10. In apparatus of the character described, in combination, a slidably mounted rack having pasting means pivoted thereto, a pinion meshing with said rack, rotating means adapted to engage said pinion to rotate it in one direction, a tripping abutment for said rotating means, and a spring adapted to rotate said pinion in the opposite direction.

11. In apparatus of the character described, in combination, a slidably mounted rack having pasting means pivoted thereto, a rotating shaft, a pinion loosely mounted thereon, means mounted upon said shaft to rotate therewith and adapted to engage a projection on said pinion whereby said pinion is rotated and said rack moved in one direction, an abutment adapted to trip said means to release said pinion, and a spring adapted to turn said pinion in the opposite direction and thereby retract said rack.

12. In apparatus of the character described, in combination, a reservoir for cards, means for applying paste to said cards, a rock-shaft, a picker arm mounted thereon and adapted to rock therewith, a finger pivotally mounted upon said picker arm, and a cam surface adapted to raise said finger upon the picker arm being rocked forward.

13. In apparatus of the character described, in combination, a reservoir for cards, means for applying paste to said cards, a rock-shaft, a picker arm mounted thereon and adapted to rock therewith, a pair of upper and lower fingers mounted upon said picker arm, a cam surface adapted to raise said lower finger, and a cam surface adapted to raise said upper finger as the picker arm rocks forward.

14. In apparatus of the character described, in combination, a reservoir for cards, means for applying paste to said cards, a rock-shaft, a picker arm mounted thereon and adapted to rock therewith, a pair of upper and lower fingers mounted on said picker arm, means adapted to raise said lower finger, and means adapted to raise said upper finger as the picker arm rocks forward, and a member adapted to engage said upper finger to move it out of contact with said lower finger.

15. In apparatus of the character described, in combination, a reservoir for cards, means for applying paste to said cards, a rock-shaft, a picker arm mounted thereon and adapted to rock therewith, a pair of upper and lower fingers mounted on said picker arm, means for simultaneously raising said fingers during the initial forward movement of said arm, and means adapted to further raise said upper finger during the final forward movement of said arm.

16. In apparatus of the character described, in combination, a reservoir for cards, means for applying paste to said cards, an oscillating vacuum conduit, a valve mounted therein and adapted to move up and down therewith, a valve-stem, a stationary member, means on said stem adapted to engage said stationary member to open said valve during the descent thereof, and a dog pivotally mounted on said conduit adapted to engage the stem of said valve to hold said valve in open position.

17. In apparatus of the character described, in combination, a reservoir for cards, means for applying paste to said cards, an oscillating vacuum conduit, a valve mounted therein and adapted to move up and down therewith, a valve-stem, a stationary member, means on said stem adapted to engage said stationary member to open said valve during the descent thereof, a dog pivotally mounted on said conduit adapted to engage the stem of said valve to hold said valve in open position, and means adapted to trip said dog to permit of the closing of said valve just before said conduit completes its upward oscillation.

18. In apparatus of the character described, in combination, a reservoir for cards, means for applying paste to said cards, a vacuum pipe, a conduit mounted to oscillate thereon, a lifter head secured to the end of said conduit, a sucker member slidably attached to said head, a valve in said conduit, a valve-stem, a stationary member adapted to be engaged by said stem to open said valve during the descent of said lifter head whereby said sucker member is rendered operative, means tending to close said valve, a dog pivotally mounted on said conduit adapted to lock said valve in open position, means adapted to trip said dog immediately prior to the completion of the upward movement of said conduit to permit of the closing of said valve, and a cam adapted to oscillate said conduit.

19. In apparatus of the character described, in combination, a pasting member, a card support adapted to be fed toward said member, means adapted to lift a card from said support, discharging rollers, and means adapted to receive said card from said lifting means and to carry same to said rollers.

20. In apparatus of the character described, in combination, a pasting device, a card support, means adapted to lift a card therefrom, card alinement breaking means adapted to co-act with said lifting means to facilitate the lifting of a single card, a discharging device, and means adapted to receive said card from said lifting means and to transmit same to said discharging device.

21. In apparatus of the character described, in combination, a pasting device, a card support, means adapted to lift a card therefrom, card alinement breaking means, a pressure member adapted to co-act with said lifting means and said breaking means to facilitate the removal of a single card, a discharging device, and means adapted to receive said card from said lifting means and to transmit same to said discharging device.

22. In apparatus of the character described, in combination, a card support, means adapted to lift a card therefrom, card alinement breaking means, a pressure member adapted to co-act with said lifting means and said breaking means to facilitate the removal of a single card, a discharging device, means adapted to receive said card from said lifting means and to transmit same to said discharging device, and means for applying paste to said card prior to the action of said lifting means.

23. In apparatus of the character described, in combination, a card support, means adapted to lift a card therefrom, card alinement breaking means, a pressure member adapted to co-act with said lifting means and said breaking means to facilitate the removal of a single card, a discharging device, means adapted to receive said card from said lifting means and to transmit same to said discharging device, means for applying paste to said card prior to the action of said lifting means, and an intermittently acting feed device for said card support.

In testimony whereof I affix my signature, in the presence of two witnesses.

ANTON E. NIELSEN.

Witnesses:
ROYAL W. FRANCE,
WILLIAM H. BROWN.